(12) United States Patent
Wa et al.

(10) Patent No.: US 6,404,944 B1
(45) Date of Patent: Jun. 11, 2002

(54) MONOLITHIC INTEGRATED ACTIVE SEMICONDUCTOR OPTICAL SWITCH FOR A 1×N INTERCONNECT SWITCH

(75) Inventors: Patrick LiKam Wa; Xuesong Dong, both of Orlando, FL (US)

(73) Assignee: Unveristy of Central Florida, Orlando, FL (US)

( * ) Notice: Subject to any disclaimer, the term of this patent is extended or adjusted under 35 U.S.C. 154(b) by 0 days.

(21) Appl. No.: 09/576,467

(22) Filed: May 23, 2000

Related U.S. Application Data

(60) Provisional application No. 60/190,274, filed on Mar. 17, 2000.

(51) Int. Cl.[7] .................................................. G02B 6/26
(52) U.S. Cl. ................................ 385/22; 385/40; 385/9; 385/8; 385/2; 385/41; 385/16
(58) Field of Search ...................... 385/40–45, 14–16, 385/130–132, 50, 22, 24, 1–10

(56) References Cited

U.S. PATENT DOCUMENTS

| | | | |
|---|---|---|---|
| 5,623,568 A | | 4/1997 | Khan et al. |
| 5,687,265 A | * | 11/1997 | Nishimoto et al. ............ 385/2 |
| 5,757,990 A | * | 5/1998 | Miyakawa ................. 385/132 |
| 5,774,604 A | | 6/1998 | McDonald |
| 5,864,643 A | | 1/1999 | Pan |
| 5,889,898 A | | 3/1999 | Koren et al. |
| 5,892,864 A | * | 4/1999 | Stoll et al. .................... 385/17 |

* cited by examiner

Primary Examiner—Cassandra Spyrou
Assistant Examiner—Fayez Assaf
(74) Attorney, Agent, or Firm—Hoffmann & Baron, LLP

(57) ABSTRACT

The present invention provides an active semiconductor optical switch for a 1×N interconnect switch having an input light channel, a plurality of output light channels, and a steering section coupled between the input and output channels. The steering section selectively directs an input light signal from the input light channel to an M number of the plurality of output light channels, where M ranges from one to the total number of output light channels of the plurality. The steering section includes transversely-spaced first and second elongate electrical contacts and an elongate slab waveguide extending therebetween. The slab waveguide is formed from a material having an optical refractive index responsive to a first electrical current applied to the first electrical contact and a second electrical current applied to the second electrical contact. Application of the first and second electrical currents to the first and second electrical contacts varies the refractive index of the slab waveguide so as to affect transmission of the input light signal to the unselected output channels. The switch of the present invention may provide two, three, four, or more selectable output light channels.

18 Claims, 2 Drawing Sheets

MONOLITHIC INTEGRATED ACTIVE SEMICONDUCTOR OPTICAL SWITCH FOR A 1×N INTERCONNECT SWITCH

This application claims benefit of Provisional application 60/190,274, filed Mar. 17, 2000.

FIELD OF THE INVENTION

The present invention is directed to the field of semiconductor optical devices. More specifically, the present invention is directed to an optical connector and switching device for selectively directing an input optical signal into one or more optical output waveguides.

BACKGROUND OF THE INVENTION

Bulk opto-mechanical switches are deployed in optical telecommunication systems to route signal traffic. U.S. Pat. No. 5,864,643 to Pan discloses a miniature 1×N opto-mechanical switch. Opto-mechanical switches require at least one of the input or output fibers to be physically translated among one of two positions. An array of mechanical switches are interconnected to form an optical cross-connect matrix switch. Bulk opto-mechanical switches are desirable for their low cost, low insertion loss, their insensitivity to polarization, and their very low levels of cross-talk. Mechanical switches suffer, however, from low speeds dictated by the mechanical movements of the switching components. The typical response time for such devices is on the order of about 0.001 to 10 seconds.

U.S. Pat. No. 5,774,604 to McDonald discloses a micro electro-mechanical 1×N switch in which an offset mirror is stepped into different positions to allow one of several fibers to be selected as the output port. The input optical signal may be re-directed by relatively small movements of the micro-mirror so that the response time of the switch is reduced as compared to bulk electromechanical switches. The physical movement required by each type of device, however, limits the switching response time to the hundreds of nanoseconds.

Micro electro-mechanical systems technology has recently been applied to the fabrication of optical switches. Researchers at the University of California at Los Angeles, IEEE Photonics Technology Letters Vol. 11, No. 11, November 1999, formed a vertical micro-mirror by self-assembly on a stress-induced curved polysilicon cantilever. Switching is accomplished by urging the mirror in and out of the path of two pairs of crossing optical fibers upon applying an electro-static electrical current between the cantilever and the substrate. Other integrated optic designs provide an imbedded waveguide which is connected and disconnected by the motion of a micro-bubble. For example, scientists at NTT opto-electronics laboratories, as reported in the Journal of Lightwave Technology, Vol. 17, No. 1, January 1999, have demonstrated a micro-electronic device in which the switching mechanism is based on the capillary effect induced by a temperature gradient.

Further, U.S. Pat. No. 5,889,898 to Koren et al. discloses a semiconductor integrated optical Y-branch switch. The two legs of the Y-branch switch each contain a serially-aligned first section where the local refractive index is controlled electrically as well as a second section where the optical loss is controlled electrically. For a signal to pass through a selected leg of the Y-branch switch, the selected leg is electrically controlled to have both a high refractive index and low absorption sections in series. Meanwhile the non-selected leg of the Y-branch switch is set to having both a low refractive index section in series with a high absorption section. As each leg or the switch requires two control signals to effect selection, four control signals must be directed to the switch in order to both propagate a signal and reduce cross-talk between the legs of the switch.

There is therefore a need in the art for an opto-electronic switch employing only a locally-controlled refractive index for selectively directing an input light signal among multiple output channels through a single steering section.

SUMMARY OF THE INVENTION

The present invention provides a semiconductor optical device that allows an optical connection to be made between one input port and one or more selected output ports. The input optical signal is launched into a single mode ridge waveguide that connects to a central beam-steering section. An array of ridge waveguides placed at the other end of the beam-steering section serves to collect the steered optical beam. An input optical signal is launched via a single-mode waveguide into the center region of a slab channel located between two contact strips through which electrical currents are injected. The presence of the charged electrical carriers forms anti-guiding regions of lower refractive index than the immediate surroundings. The region with the least amount of electrical carriers has the highest refractive index and the optical signal is confined to that region. By controlling the relative strengths of the current injections in the two contact strips, the region of highest refractive index can be selectively positioned back and forth between the contact strips. Consequently, the input beam is transported to one of the single-mode output waveguides. When the injected current densities are very low, the output optical beam spreads to all of the output waveguides and gives rise to a broadcasting scenario. Other intermediate currents are used to direct the optical signal to several output waveguides simultaneously hence performing the task of selective multi-casting.

The present invention provides an active semiconductor optical switch for a 1×N interconnect switch having an input light channel; first and second output light channels; and a steering section coupled between the input and output channels. The steering section selectively directs an input light signal from the input light channel to at least one of the first and second output light channels. The steering section may alternatively direct an input light signal to one or both of the first and second output light channels. The steering section includes transversely-spaced first and second elongate electrical contacts and an elongate slab waveguide extending therebetween. The slab waveguide is formed from a material having an optical refractive index responsive to a first electrical current applied to either of the first and second electrical contacts. Application of an electrical currents to the first and second electrical contacts varies the refractive index of the localized channel waveguide so as to steer the input light signal to at least one of the first and second output channels. The switch of the present invention may provide two, three, four, or more selectable output light channels.

Alternatively stated, the present invention provides an active semiconductor optical waveguide for a 1×N interconnect switch providing a single input channel and N output channels. The steering section of the switch is capable of directing light from the input channel to M output channels, where M is a number between one and N.

Switches formed according to the present invention are useful for creating a monolithic 1×N matrix switch having each output light channel of a first switch optically-coupled to an input light channel of another switch. Successive switches may be similarly cascaded to provide a single input channel having multiple selectable output channels.

DETAILED DESCRIPTION OF THE PREFERRED EMBODIMENT

Figure 1:
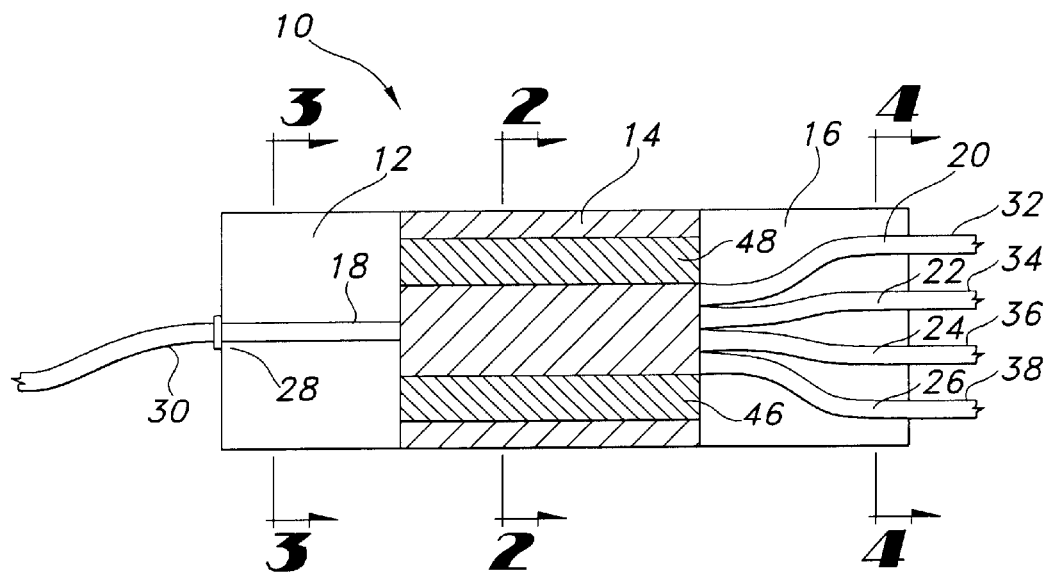
FIG. 1 depicts a monolithic integrated active semiconductor optical switch for a 1×N interconnect switch the present invention.

FIG. 1 depicts an optical switch 10 of the present invention. Switch 10 is desirably formed as a monolithic component having an input light channel section 12, a steering section 14, and an output light channel section 16. Switch 10 is shown as a 1×4 switch having a single input channel 18 and four output channels 20, 22, 24, and 26. The present invention contemplates, further, that switch 10 may accommodate two, three, or more than four output channels. Further still, the present invention provides an active semiconductor optical waveguide for a 1×N interconnect switch providing a single input channel and N output channels. The steering section of the switch is capable of directing light from the input channel to M output channels, where M is a number between one and N.

Figure 2:
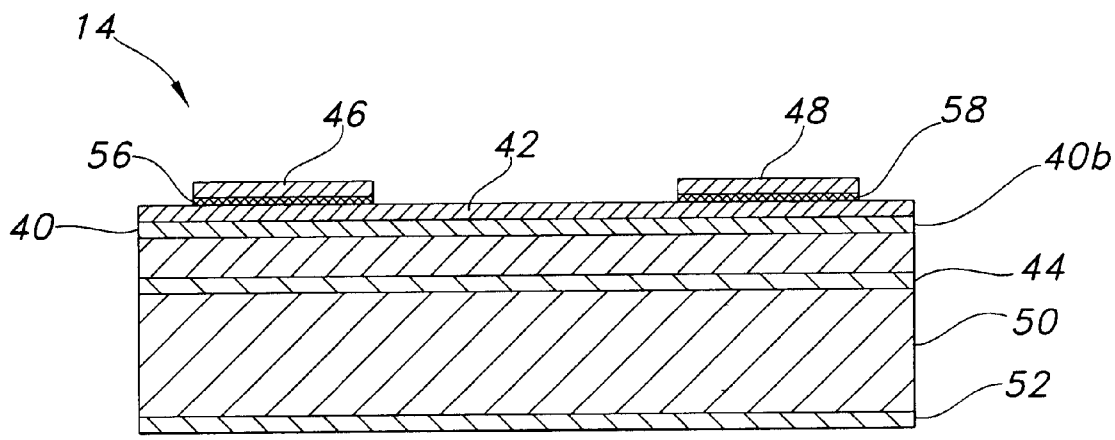
FIG. 2 is a cross sectional view of the steering section of the switch of FIG. 1, taken through the line 2—2.
Figure 3:
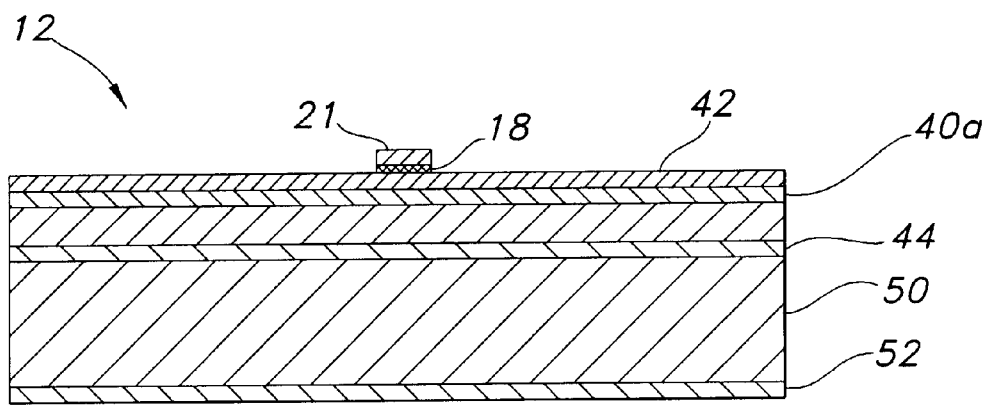
FIG. 3 is a cross-sectional view of the input light channel of the switch of FIG. 1, taken through the line 3—3.
Figure 4:
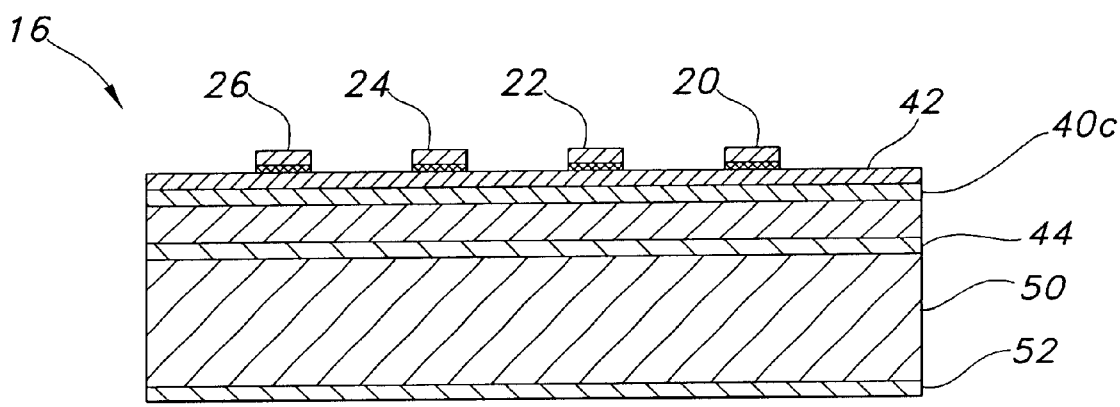
FIG. 4 is a cross-sectional view of the output light channels of the switch of FIG. 1, taken through the 4—4.

As shown in FIGS. 2–4, switch 10 is desirably a monolithic component whereby the three sections 12, 14, and 16 are formed by a common contact layer 52, substrate layer 50, cladding layers 42 and 44, and optically-transmissive core layer 40. Cladding layer 42 is etched differently in each of sections 12, 14, and 16 to impart the desired characteristics thereto. Sections 12, 14, and 16 are separately described hereinbelow. In one embodiment of the present invention, core 40 and cladding layers 42 and 44 are formed of compositions of AlGaAs. Generally, the present invention contemplates that core layer 40 may be formed of $Al_xGa_{1-x}As$ and cladding layers 42 and 44 may be formed from $Al_yGa_{1-y}As$ where x and y are selected to provide cladding layers 42 and 44 with a lower index of refraction than core layer 40 so as to form a waveguide. For purposes of illustration and not of limitation, core 40 may be formed from GaAs while cladding layers 42 and 44 may be formed from $Al_{0.2}Ga_{0.8}As$. The present invention also contemplates that other optically-transmissive materials may be employed as core and cladding as is known in the art. For example, the present invention may be fabricated from an indium phosphide material whereby optically-transmissive core layer 40 and cladding layers 42 and 44 are formed from compositions of InGaAsP for producing a waveguide.

Input channel 18, shown in FIG. 3, is desirably a single-mode ridge waveguide 21 for guiding an input light signal from an input end 28 to steering section 14. Input channel section 12 includes an optically-transmissive core portion 40a of core layer 40. Input channel section 12 also provides for optical coupling to an optical fiber cable 30, by methods well-known in the art, through which the input light signal is launched through switch 10.

Steering section 14 selectively directs the input light signal among one or more of output channels 20, 22, 24, and 26 as desired, including the option of broadcasting the input light signal through either adjacent or all output channels. Each output channel 20, 22, 24, and 26 may be individually coupled with an optical fiber 32, 34, 36, and 38, respectively, or to another type of light-transmissive media for propagating the light signal.

FIG. 2 provides a cross-sectional view of steering section 14 which desirably comprises a slab waveguide structure having a double heterojunction laser diode configuration. Steering section 14 includes an elongate planar optically-transmissive core portion 40b positioned between elongate substantially planar upper and lower cladding layers 42 and 44. Core portion 40 abuts core layer 40a of input light channel section 12. Cladding layer 42 is desirably doped p-type while cladding layer 44 is desirably doped n-type. First and second elongate planar gold contact strips 46 and 48 extend along cladding layer 42 between input section 12 and output section 16. An elongate substrate 50, formed from a material selected for optimal performance with core 40 and cladding layers 42 and 44, extends along cladding layer 44 opposite from core layer 40. A cathode contact 52 extends along substrate 50 opposite cladding layer 44. Contact 52 is desirably formed from a combination of Ni/Ge/Au.

Figure 5:
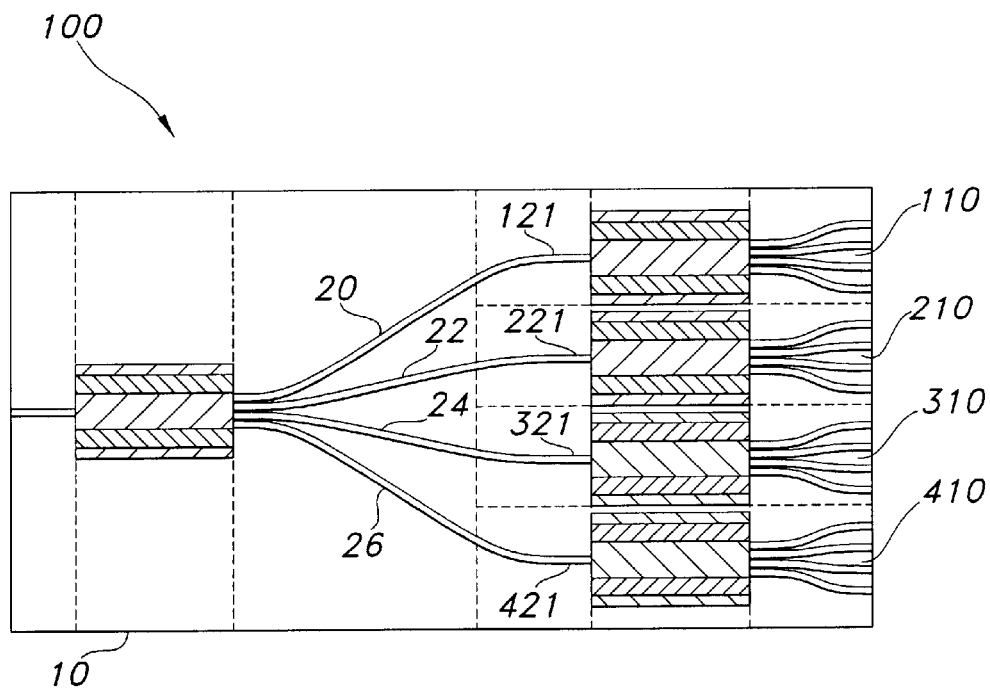
FIG. 5 depicts a 1×16 optical switch formed in accordance with the present invention.

Referring now to FIG. 4, Output light channels 20, 22, 24, and 26 are desirably formed as tapered single-mode waveguides for collecting light passing through core 40 of steering section 14. Output light channel section 16 includes an optically-transmissive core portion 40c of core layer 40 which is optically coupled to output fibers 32, 34, 36, and 38. Alternatively, as shown in FIG. 5, a first switch 10 may be cascaded with second switch 110, third switch 210, fourth switch 310, and fifth switch 410 so as to create a 1×16 optical switch assembly 100. Each of the switches of FIG. 5 is formed in accordance with switch 10 and arranged having output waveguides 20, 22, 24, and 26 of first switch 10 optically coupled with the input waveguides 121, 221, 321, and 421 of switches 110, 210, 310, and 410, respectively.

Referring again to FIGS. 2–4, core layer 40, cladding layer 44, substrate 50 and contact 52 are desirably formed as unitary components extending through each of input light section 12, steering section 14, and output light section 16. Cladding layer 42 is desirably etched to provide the ridge waveguide and tapered waveguide structures for input section 12 and output section 16. Cladding layer 42 is also desirably etched to provide contact support beds 56 and 58 for co-extensively supporting contact strips 46 and 48 respectively.

Referring still to FIGS. 1–4, the operation of switch 10 will be described. An input light signal is launched through core portion 40a of input light channel 12 and into core portion 40b of steering section 14. If no electrical current is applied to either contact strip 46 or 48, light launched into steering section 14 spreads out, in a broadcast mode, to each of the output waveguides 20, 22, 24, and 26 in output light channel section 16. Applying electrical currents to either of contact strips 46 or 48 causes electrons to accumulate in core portion 40b so as to deflect the transmission of light therethrough. The electrons collect in core layer 40 about the contact strip to which the current is applied. Increasing the current applied to the contact strip causes the electrons to accumulate laterally across the planar core layer out from the active region beneath the contract strip. Applying currents to both contact strips 46 and 48 causes the accumulated electrons to extend towards the middle of core layer 40 therebetween. It has been found during operation of switch 10 that when a first electrical current is applied to one of the contract strips 46 or 48, a second electrical current should be applied to the other contract strip in order to provide for steering of the input light signal. The second electrical current, even though it may have a significantly lower magnitude than the first electrical current, is necessary for steering the input light signal.

The regions of core layer 40 where the electrons accumulate have a lower refractive index than those regions of core layer 40 lacking electrons. Consequently the regions of lower refractive index, corresponding to the regions having high concentrations of electrons, extend laterally from the contact strips to which current is applied. By varying the current levels applied to contact strips 46 and 48, a channel of high refractive index becomes located between input light channel section 12 and output light channel section 16. Switch 10 may thus selectively direct an input light signal to one or more of output light channels 20, 22, 24, and 26 depending on the levels of current applied to contact strips 46 and 48. Subsequently varying the currents applied to contact strips 46 and 48 can vary spreading of the free electrons across core layer 40 so a to laterally shift the location of a localized waveguide, or region of high refractive index, back and forth thereacross. Additionally, it has been found that the application of high current levels to both contact strips 46 and 48 causes such a an accumulation of electrons across core layer 40 that the input light signal passes through steering section 14 substantially undeflected. Thus, a broadcast mode transmission of an input light signal through to all of the coupled output light channels 22, 24, 26, and 28 may be realized by the application of high current levels to both contact strips 46 and 48.

While the preferred embodiment of the present invention has been shown and described, it will be obvious in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An active semiconductor optical switch for a 1×N interconnect switch, comprising:
   an input light channel;
   a plurality of output light channels;
   a steering section coupled between said input and output channels for selectively directing an input light signal from said input light channel to an M number of said plurality of output light channels, where M ranges from one to the total number of output light channels of said plurality, said steering section comprising first and second elongate electrical contacts and an elongate slab waveguide extending between said first and second electrical contacts, said slab waveguide formed from a material having an optical refractive index responsive to a first electrical current applied to one of said first and second electrical contacts;
   wherein application of a first and second electrical current to said first and second electrical contacts varies the refractive index of said slab waveguide thereabout so as to guide said input light signal to at least one of said plurality of output channels.

2. An active semiconductor optical switch according to claim 1, further comprising first, second, third, and fourth transversely-arrayed output channels optically coupled to said steering section for conducting said input light signal from said steering section, wherein application of said first and second electrical currents to said first and second electrical contacts affects the transmission of said input light from said steering section through said first, second, third, and fourth output channels.

3. An active semiconductor optical switch according to claim 2, wherein said steering section further comprises:
   substantially planar elongate first and second cladding layers;
   a substantially elongate planar optically transmissive core layer, for conducting said input light signal between said input and output channels, positioned between said first and second cladding layers;
   a substantially elongate planar substrate positioned along said second cladding layer opposite said core layer; and
   a substantially elongate planar cathode layer positioned along said substrate opposite said second cladding layer.

4. An active semiconductor optical switch according to claim 3, wherein said core layer comprises $Al_xGa_{1-x}As$ and said first and second cladding layers comprise $Al_yGa_{1-y}As$ whereby x and y are selected such that the refractive index of said cladding layer is lower than the refractive index of said core layer so as to provide an optical waveguide.

5. An active semiconductor optical switch according to claim 3, wherein said core layer comprises indium gallium arsenide phosphide and said first and second cladding layers comprise indium gallium arsenide phosphide whereby the specific compositions of each layer are selected to provide a waveguide.

6. An active semiconductor optical switch according to claim 3, wherein said first cladding layer provides first and second elongate planar raised beds, each of said first and second raised beds supporting one of said first and second electrical contacts.

7. An active semiconductor optical switch according to claim 3, wherein said first and second electrical contacts further comprise first and second elongate planar electrically conductive contact strips.

8. An active semiconductor optical switch according to claim 7, wherein said electrically conductive contact strips are formed from metal.

9. An active semiconductor optical switch according to claim 8, wherein said electrically conductive contact strips are formed from gold.

10. An active semiconductor optical switch according to claim 3, wherein said first and second output light channels are coupled to a region of said slab waveguide extending between said first and second electrical contacts.

11. An active semiconductor optical switch according to claim 1, wherein said input light channel further comprises a first single-mode ridge waveguide.

12. An active semiconductor optical switch according to claim 1, wherein said first and second output light channels each further comprise a single-mode ridge waveguide.

13. An active semiconductor optical switch according to claim 1, wherein the optical refractive index of said slab waveguide increases with distance from said first and second electrical contacts upon application of said first and second electrical currents thereto.

14. An active semiconductor optical switch according to claim 1, further comprising a third and a fourth output light waveguide positioned adjacent to said first and second output light waveguides, whereby application of distinct electrical currents to each of said first and second electrical contacts varies the refractive index of said slab waveguide as a function of distance between said first and second electrical contacts so as to direct light launched through said input light channel to one or more of said first, second, third, and fourth output light channels.

15. An active semiconductor optical switch according to claim 1, wherein said slab waveguide further comprises an elongate planar core layer positioned between a first and second elongate cladding layer, a substrate layer coextensive with said second cladding layer opposite to said input and output light channels, and a cathode layer coextensive with said substrate layer opposite said second cladding layer.

16. An active semiconductor optical switch according to claim 15, wherein each of said input and output light channels further comprise a core layer optically coupled to said core layer of said slab waveguide.

17. A monolithic semiconductor optical switch comprising:

a first, second, and third of said 1×N switches of claim 1, wherein an input light channel of said second 1×N switch is optically coupled to said first output light channel of said first 1×N switch and an input light channel of said third 1×N switch is optically coupled to said second output light channel of said first 1×N switch.

18. A monolithic 1×N semiconductor optical switch, comprising:

a plurality of said 1×N switches of claim 1 assembled in a cascading arrangement whereby each output light channel of a 1×N switch is optically coupled with an input light channel of a heretobefore uncoupled 1×N switch.

* * * * *